April 14, 1936.  J. A. SMITH  2,037,401

PUMPING APPARATUS

Original Filed Jan. 31, 1929    6 Sheets-Sheet 1

Inventor
Jasper A. Smith
By Spencer, Hardman, and Fehr
Attorney

April 14, 1936.  J. A. SMITH  2,037,401
PUMPING APPARATUS
Original Filed Jan. 31, 1929    6 Sheets-Sheet 2
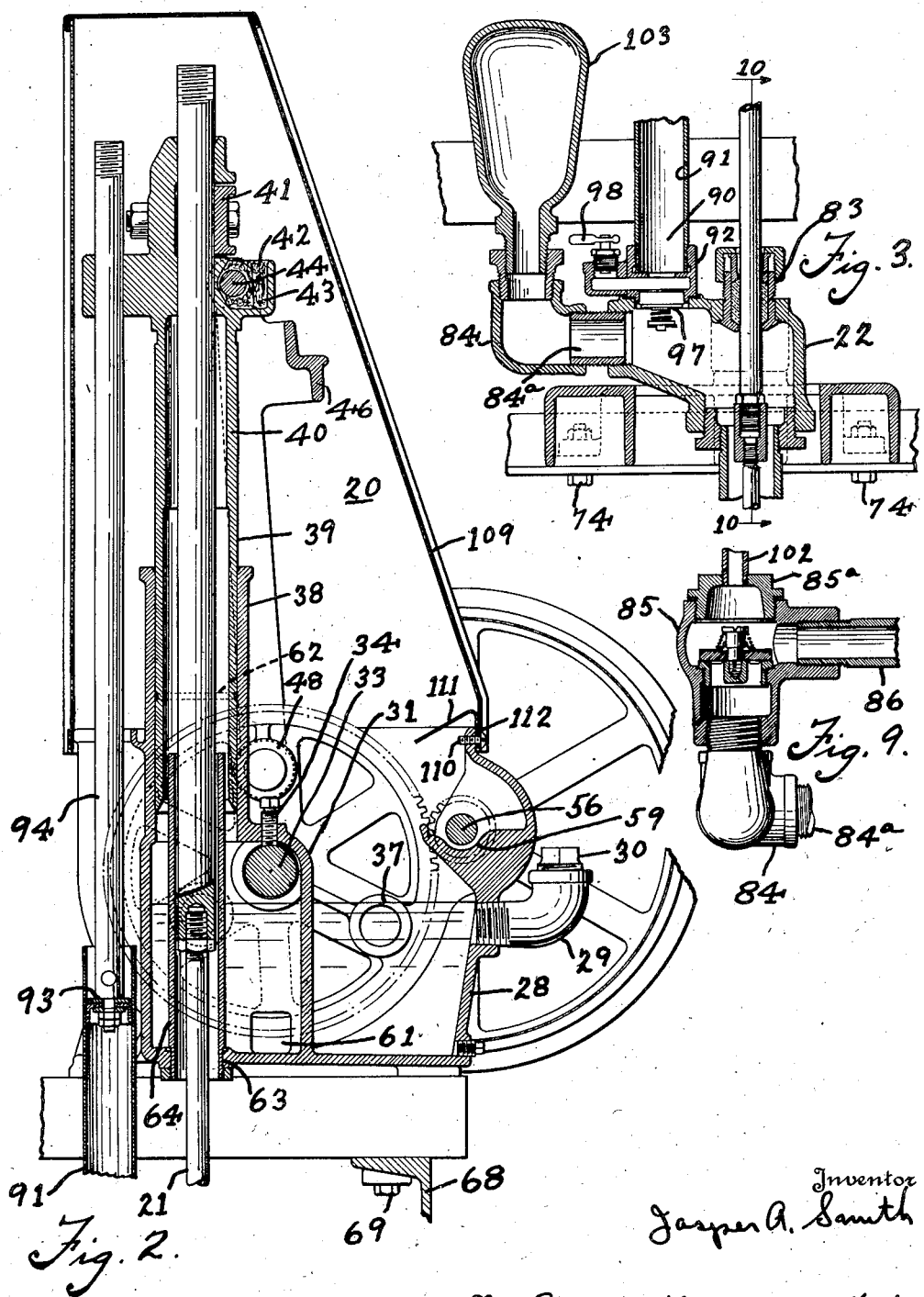

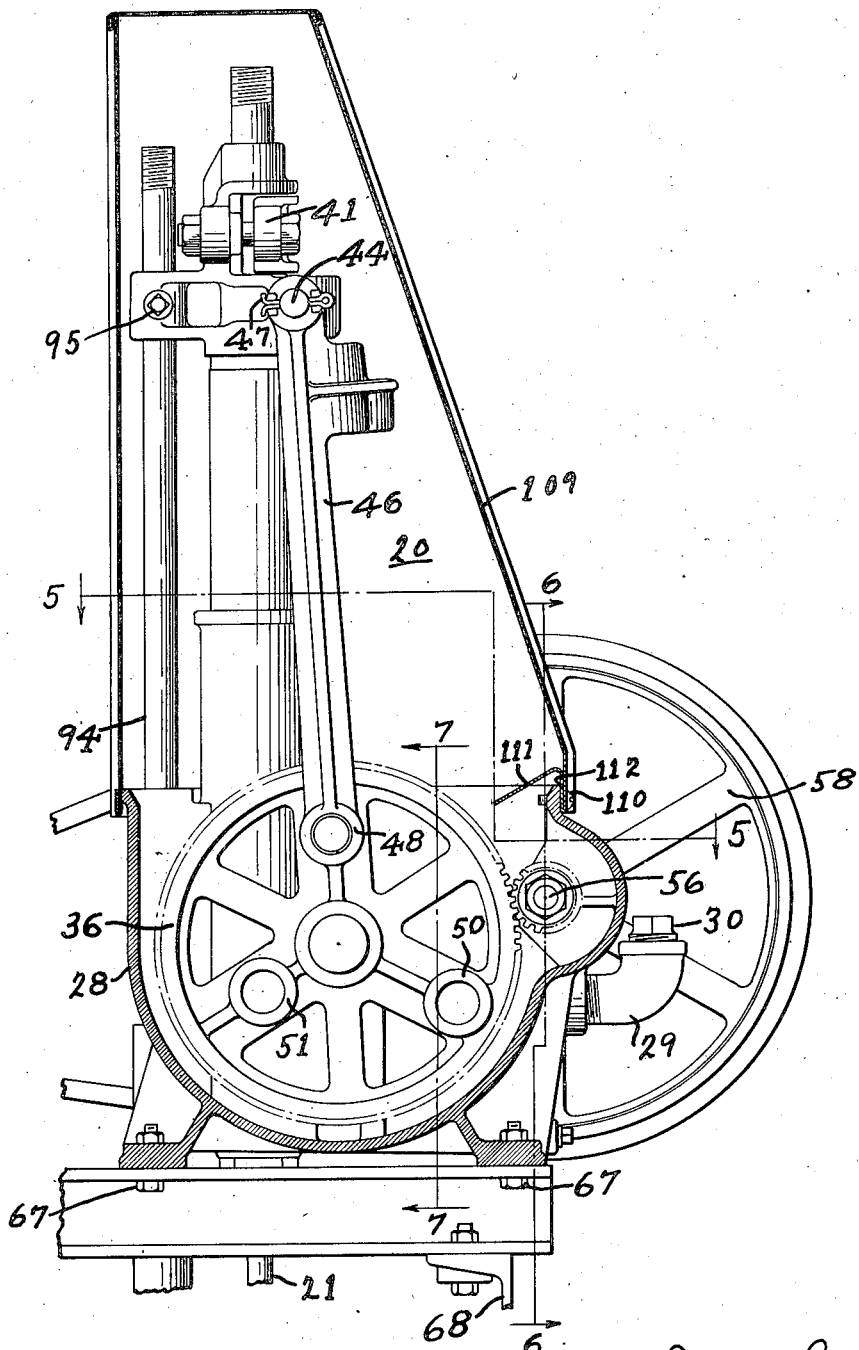

April 14, 1936.   J. A. SMITH   2,037,401
PUMPING APPARATUS
Original Filed Jan. 31, 1929   6 Sheets-Sheet 5
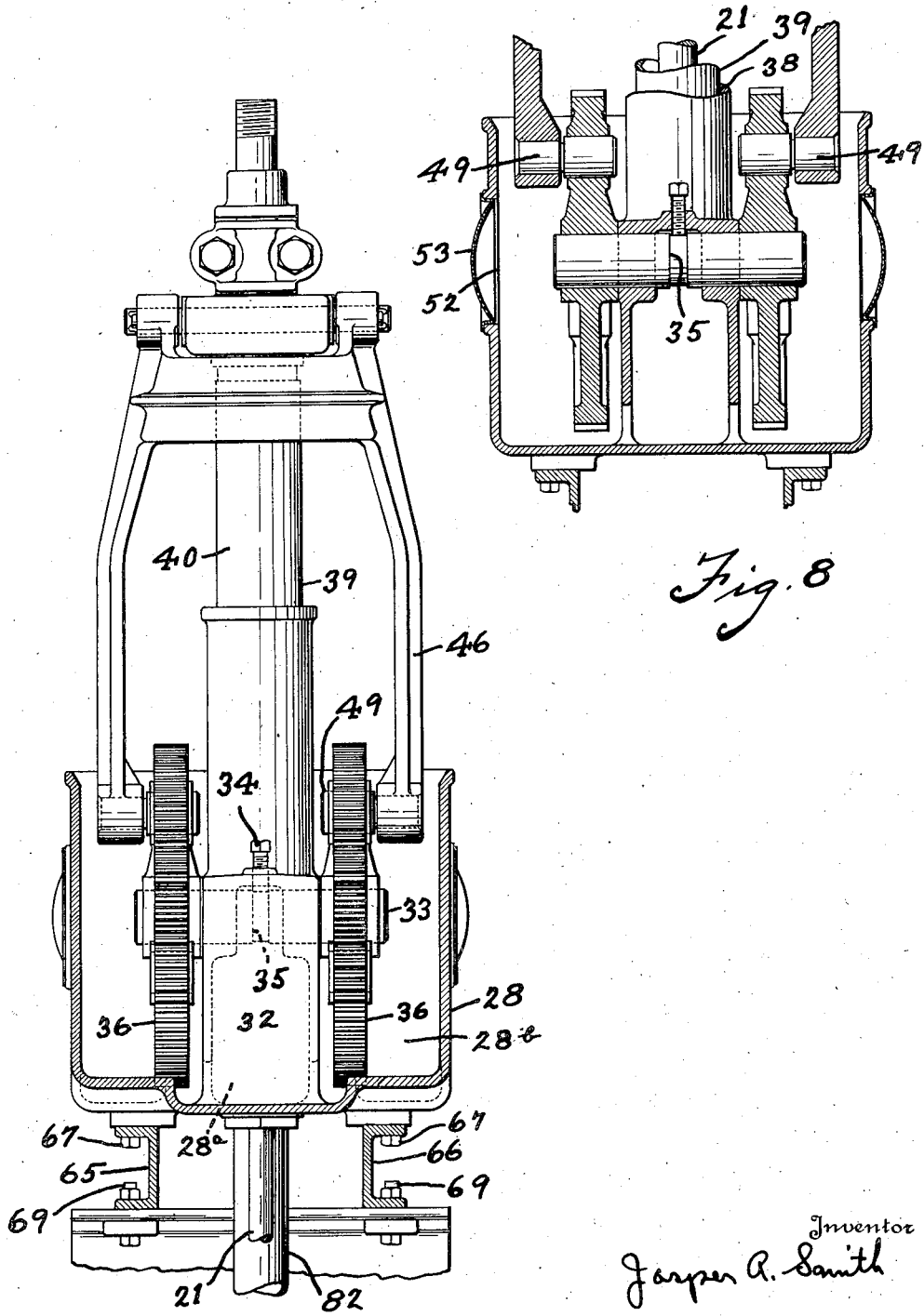

Patented Apr. 14, 1936

2,037,401

UNITED STATES PATENT OFFICE 2,037,401

PUMPING APPARATUS

Jasper A. Smith, Dayton, Ohio, assignor to Delco Appliance Corporation, a corporation of Delaware Application January 31, 1929, Serial No. 336,426
Renewed August 11, 1933

15 Claims. (Cl. 184—4)

This invention relates to improvements in pumps, and more particularly, to improvements in power transmitting devices for pumps.

One of the objects of the present invention is to provide an improved, compact, enclosed and self-lubricating power transmitting device for pumps.

More specifically it is an object to provide an improved power transmitting device having a casing adapted to contain a quantity of oil, the pump transmission mechanism being of the type in which a pump rod extends through an opening in the bottom wall of said casing and in which means is provided for preventing the escape of oil through said opening in the casing.

A further object is to utilize the maximum power stroke of the power transmitting device when the pumping load is greatest and one manner of carrying this out is to embody a pitman which will have a substantially direct thrust upon the pump rod for the upward movement thereof.

A still further object is to provide means for preventing oil from being splashed out of the casing by the actuating mechanism.

Further objects and advantages of the present invention will be apparent from the following description, reference being had to the accompanying drawings, wherein a preferred form of the present invention is clearly shown.

In the drawings:

Fig. 2 is a vertical cross sectional view of the power transmitting device;

Fig. 3 is a vertical cross sectional view of the discharge head, and is a continuation of Fig. 2;

Fig. 4 is a side view of the power transmitting device partly in elevation and partly in section;

Fig 7 is an end view of the device, the casing being shown in section, the section being taken substantially on the line 7—7 of Fig. 4;

Fig. 8 is a cross sectional view taken on the line 8—8 of Fig. 5;

Fig. 9 is a vertical cross sectional view of the check valve showing fragments of the discharge line;

Figure 1:
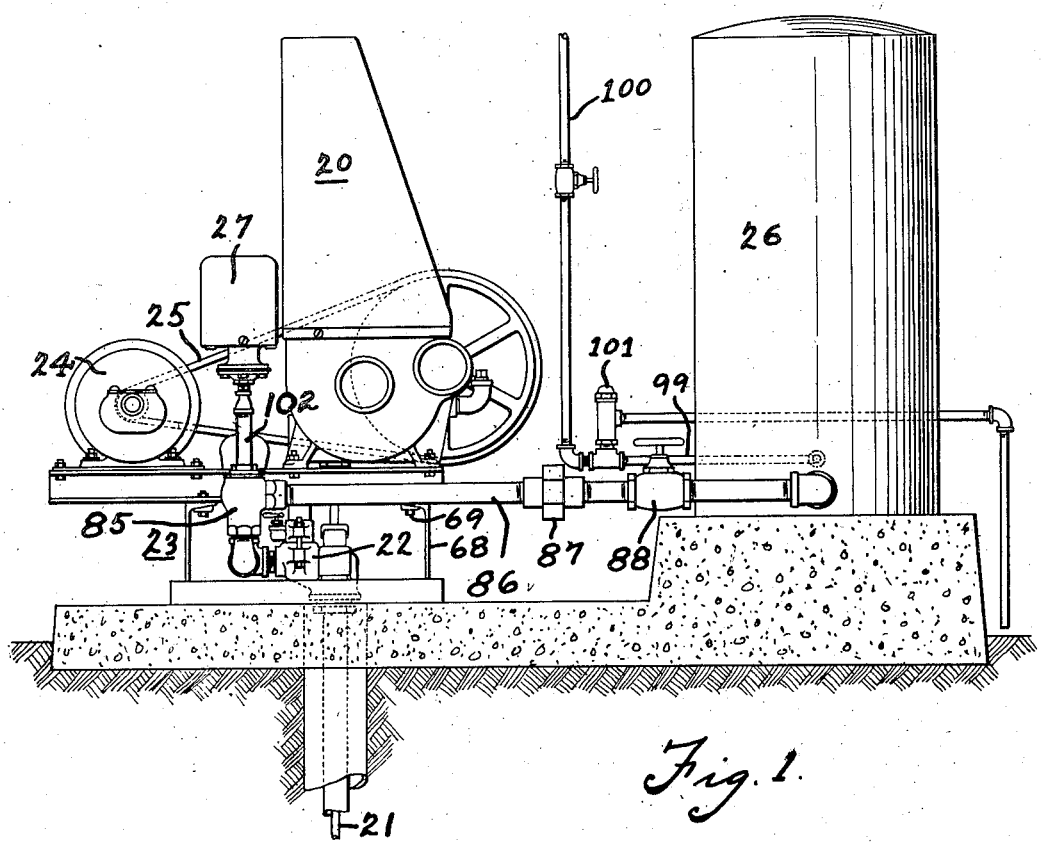
Fig. 1 is a side elevation of a deep well pump, and a power transmitting device therefor.
Figure 10:
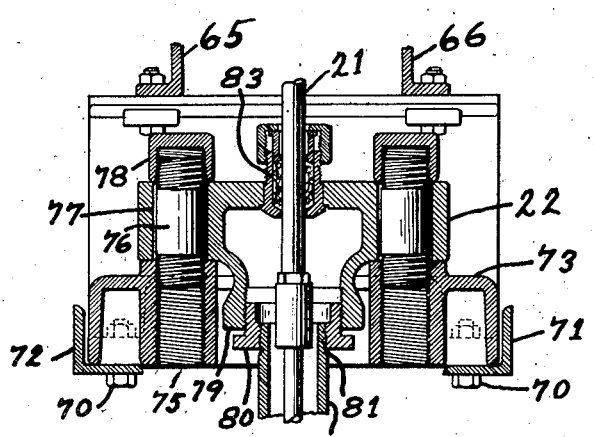
Fig. 10 is a cross sectional view taken on the line 10—10 of Fig. 3.
Figure 6:
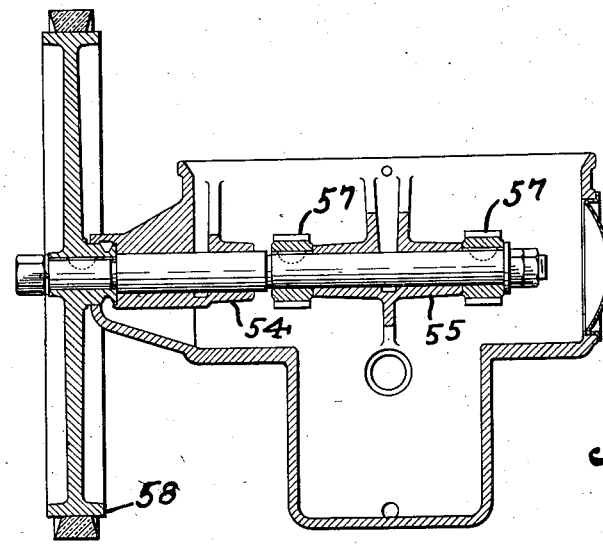
Fig. 6 is a cross sectional view taken on the line 6—6 of Fig. 4.

Referring to the drawings and more particuarly to Fig. 1, 20 designates generally a power transmitting device or power head adapted to reciprocate a pump or sucker rod 21. A discharge head 22 is disposed on the lower portion of a frame 23, which frame also comprises a support for the power head and a driving motor 24 adapted to actuate the power head by the belt 25. The motor is adapted to start and stop in response to the pressure in the storage tank 26, and is controlled by the switch 27.

Referring more in detail to the drawings, the power head 20 comprises a casing 28 adapted to contain a quantity of oil and having a filler neck 29 and cap 30. An upwardly extending portion 31 is formed integrally with the casing 28 to provide a walled chamber 32 disposed intermediate the side walls of the casing, and to also divide the casing into a plurality of compartments 28a and 28b. A shaft 33 is carried by the wall 32 and is held in position by a set screw 34 seating in an annular groove 35 in the shaft. Large driven gear wheels 36 are mounted on the shaft 33 on opposite sides of the wall 32, and are adapted to rotate in a clockwise direction. The gears are adapted to dip in the oil in casing 28, the oil level being indicated at 37. By this construction the gear wheels 36 and the shaft therefor are mounted entirely within the casing 28. The upwardly extending portion 31 of the casing 28 merges into and provides a sleeve guide 38 which cooperates with a slide 39 formed on the outer portion of a hollow crosshead 40. The pump rod 21 extending through the crosshead is secured thereto by the clamp 41. An oil reservoir 42 including packing 43, adapted to contain and supply oil to a shaft 44, is disposed in the upper portion of the crosshead 40. A pitman 46, in the form of a yoke provided with two legs joined near the upper end, is connected to the shaft 44 and held in place by the keys 47. The lower end of the pitman is connected to the gear wheels 36 at connecting points 48 by stub shafts 49. The gear wheels are each provided with a plurality of connecting points 50 and 51 graduatedly spaced intermediate the axis and periphery of the gear wheels to readily permit adjustment of the stroke of the pump rod. The stub shafts 49 are secured to the pitman and can be inserted at either of the points or openings 48, 50 and 51. It is obvious that the lower end of the pitman may be attached to the gear wheel at the connecting point most advantageous to the pumping conditions.

To facilitate assembling or repairing of the power head, the casing 28 is provided with openings 52 having covers 53. The openings provide for the insertion or removal of the shaft 35.

Inwardly extending portions 54 and 55 of the casing 28 provides a journal for a shaft 56 having pinions 57 mounted thereon and which drive the large gears 36. The pinion shaft 56 extends through the side of the casing and is driven by the pulley 58. The portions 54 and 55 are adapted also to provide catchment 59 which receives oil picked up by the large gears and which is squeezed from between the teeth of the gears and pinions during the rotation of same. The oil in the catchments then flows into suitable opening leads 60, in the catchment, to the shaft 56. During rotation of the gear wheels the oil will be agitated sufficient to lubricate the shaft 33 and the gear bearings.

In Fig. 4 it will be apparent that rotation of the gear wheels will cause reciprocation of the crosshead 40, likewise the pump rod 21 and slide 39. It will also be apparent that due to the fact that the pump rod is disposed to one side of the axis of the gears 36, during the upward or power stroke of the pump rod, that is when the load is greatest, the pitman 46 will move substantially parallel with and therefore have a substantially direct thrust upon the crosshead carrying the pump rod, thus providing the maximum driving power when the load is greatest.

In order to lubricate the slide and guide, oil is admitted to the interior of the portion 32 through the opening 61 below the oil level. An annular groove 62 is cut in the slide for conveying oil upwardly to lubricate the upper portion of the guide. It is understood that the slide when it is in its lowermost position, will dip into the oil.

To prevent the escape of oil through the opening 63 in the bottom wall of the portion 32 there is provided a standpipe 64 through which the pump rod extends. The standpipe is disposed in the opening 63 and provides a passageway through the oil and terminates in the slide 40 and above the level of the oil in the casing 28. It will be noted in Fig. 2 that the upper portion of the standpipe is at all times above the lowermost portion of the slide 39. By this construction, the oil which may be violently agitated by the actuating mechanism is prevented from escaping through the opening 63.

The power head is secured to the upper portion of the frame 23 comprising a pair of U-shaped channel irons 65 and 66, by bolts 67. Suitable legs or standards 68 are secured to the upper portion of the frame 23 by bolts 69 and form a support therefor. The legs 68 are mounted upon the lower portion of the frame 23 by bolts 70. The lower portion includes a pair of angle irons 71 and 72, having their flat side disposed at the bottom, on which the discharge head mounting 73 is secured thereto by bolts 74. The discharge head is disposed directly below the power head, between the upper and lower portions of the frame 23, on the mounting 73. The mounting is provided with threaded apertures 75 in which one end of the nipples 76 are inserted. The nipples extend upwardly through openings 77 in the discharge head, and on the opposite ends of the nipples are secured caps 78, which caps clamp the discharge head to the mounting. The discharge head includes a threaded flange 79 disposed in the lower portion thereof and carries a threaded bushing 80 to which the threaded end 81 of a drop pipe 82 is secured. The pump rod extends through a suitable packing box 83 disposed in the upper portion of the discharge head to prevent water from escaping from the discharge head. A cylinder, cylinder plunger and a cylinder plunger valve (not shown) are used in lifting water to the discharge head, whence it flows through a pipe 84a and a fitting 84 one end of which is connected with a check valve 85. The water passes through this valve 85 and then through the pipe 86 into the tank 26. The pipe 86 includes a union 87 and a hand shut-off valve 88 which may be operated manually to prevent water in the tank from returning through the pipe 86 in the event the check valve and discharge head are disconnected from the pipe 86.

Figure 5:
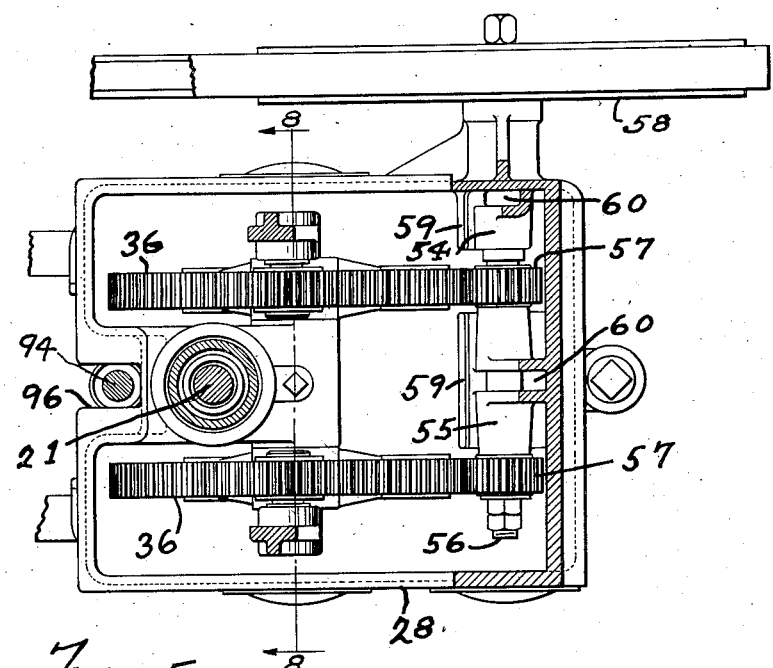
Fig. 5 is a cross sectional view taken on the line 5—5 of Fig. 4.

An air pump 90 is also actuated by the power head 20. The pump comprises a cylinder 91 secured to a pump head 92 carried by the upper portion of the discharge head 22, adjacent the packing box 83. A piston 93 reciprocates within the cylinder and is driven by a piston rod 94 connected at its upper end to the upper end of the crosshead 40 by a set screw 95. Referring to Fig. 5 it will be noted that the casing 28 is provided with an indented or recessed portion 96 which receives the piston rod 94.

Air is admitted to the cylinder about the piston on the upward stroke of the piston. On the downward stroke of the piston, air is forced through a large valve 97 into the discharge head 22, whence it passes with the water to the storage tank 26. A hand valve 98 is disposed in the pump head and may be operated manually to permit the escape of air from the cylinder 91 in the event sufficient air is present in the storage tank. The large discharge valve 98 which controls the outlet of the cylinder 91 is of sufficient size to permit readily the escape of all the water in the cylinder in the event that water should find its way into the cylinder. The storage tank 26 has a pipe 99 leading to the main service pipe 100. This pipe 99 has a pressure relief valve 101 which automatically releases pressure in the tank in case the pressure should become excessive.

A pressure pipe 102 is connected to the check valve cap 85a and leads to the switch 27. Since the pressure in the pipe 102 leading to the operating mechanism of the switch 27 is equal to the pressure in the storage tank 26, the switch is adapted to actuate in response to the pressure in the storage tank. When the pressure within the tank reaches a predetermined high value the switch is adapted to break the electrical connection to the driving motor 24. As the pressure recedes, the switch operating mechanism returns to its original position thereby making the contact which allows current to flow to the driving motor and permitting the pump 90 to operate until the desired pressure is reached. The upper outlet of the fitting 84 is connected to an air dome 103 which prevents water hammer.

Figure 11:
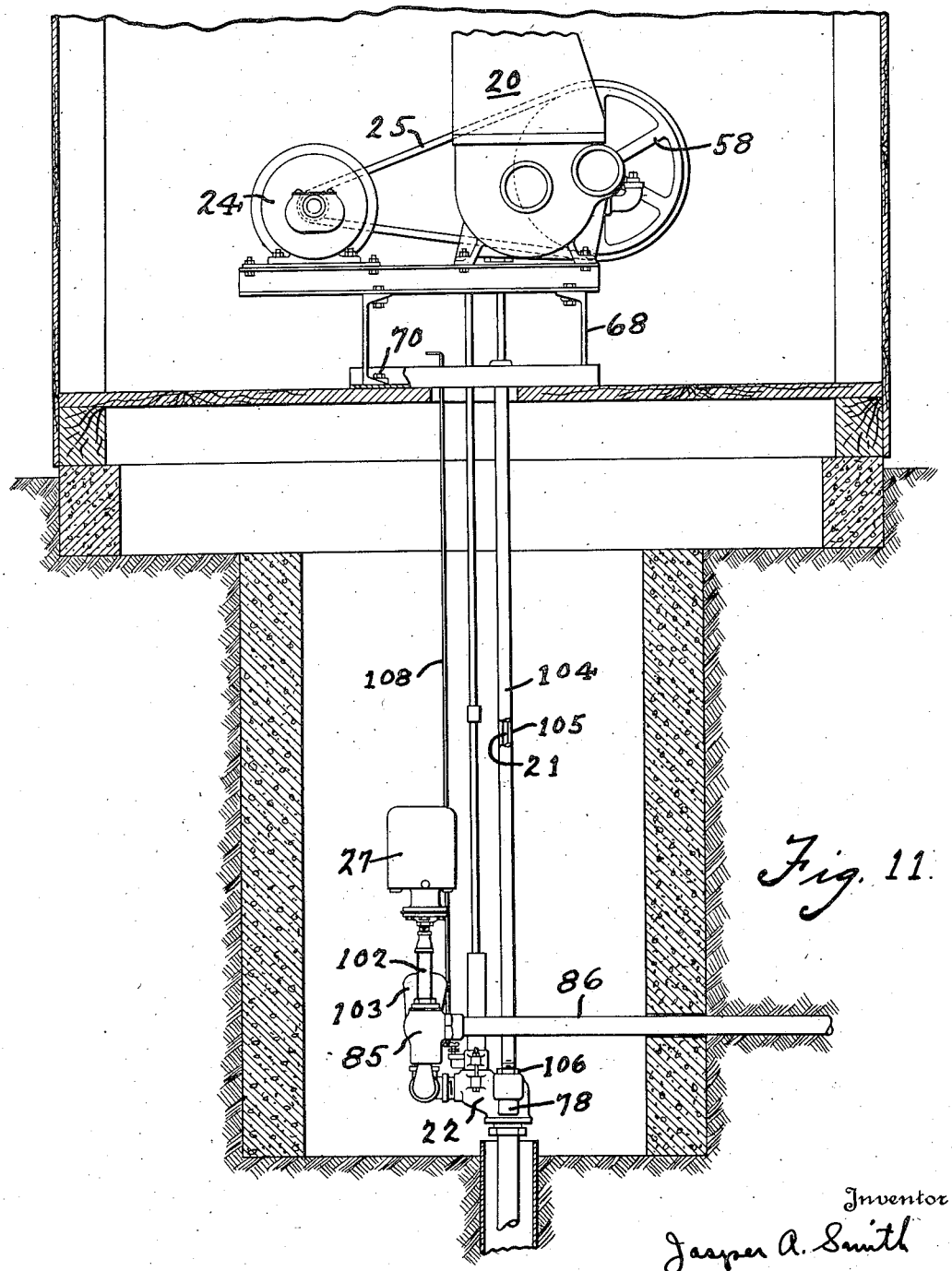
Fig. 11 is a view similar to Fig. 1, showing a modified form of installation.

Referring to Fig. 11 there is shown a method of installation in case it is desirable to place the discharge head below the frost line. In this installation the nipples 76 are not used and the discharge head is carried below discharge head mounting 73. Suitable extension pipes 104 and 105 are used to carry the discharge head below the mounting 73. The pipes are threaded on each end, the upper end is threaded into the apertures 75 on the mounting 73 and the lower end extends through the opening 77 in the discharge head 22. The discharge head is clamped between the nuts 106 and caps 78. These extension pipes may be of any desired length according to the distance of the frost line. An extension rod 108 is provided which is adapted to actuate the hand valve 98. It will of course be understood that other and suitable pump and piston rods are used to suit the depth of the discharge head. And it also is to be understood that the section of the pump or sucker rod passing through the packing 83 should be made preferably of brass.

A hood 109 is placed over the casing and joined to the side walls of the casing by screws 110 and covers the actuating mechanism of the power head 20. An oil deflector 111 formed integral with the hood 109 is disposed within the enclosure directly over the joint 112 and is adapted to deflect downwardly any oil which may under certain conditions be agitated violently and directed toward the joint 112 by the actuating mechanism. In this manner oil can not escape at the joint 112 of the hood 109 and casing 28.

Another advantage of the present invention lies in the simplicity of assembling and disassembling the transmission device. In assembling the device, the crosshead 40, the yoke type pitman 46, the stub shafts 49 and the gears 36, are arranged as a subassembly. The crosshead is inserted into the crosshead guide and the gears 36 are inserted into the casing compartment 28b. Then the shaft 33 is inserted through one of the side openings 52, through the gears 36 and the supporting wall where it is locked in position by set screw 34. If at any time it is necessary to inspect the gears 36, it is necessary only to disconnect the pump rod from the yoke, remove the shaft 33 through one of the openings 52 and then the gears can be withdrawn from the casing.

While the form of embodiment of the invention as herein disclosed, constitutes a preferred form, it is to be understood that other forms might be adopted, all coming within the scope of the claims which follow.

What is claimed is as follows:

1. A power transmitting device for deep well pumps, comprising in combination, a casing adapted to contain a quantity of oil, a reciprocating pump rod extending through an opening in the bottom wall of said casing, driving mechanism within the casing connected with said rod, a hollow slide connected with the pump rod, means within the casing forming a guide, said slide adapted to reciprocate in said guide, said slide and guide being disposed directly above said opening, said slide being adapted to dip into said oil when approaching its lowermost position for conveying lubricant to said guide, and means for preventing oil delivered to the guide and slide from escaping through said opening including a tube disposed in said opening, surrounding said pump rod and extending upwardly from the bottom wall and through the oil and terminating in the hollow slide above the oil level in the casing.

2. A power transmitting device for deep well pumps, comprising in combination, a casing adapted to contain a quantity of oil and having a walled compartment intermediate the side walls thereof, a shaft carried by said intermediate walled compartment, a gear carried by the shaft on one side of said intermediate walled compartment, a slide and a guide therefor disposed above said walled compartment, means connecting said gear and slide, said intermediate walled compartment having an opening therein below the level of oil in the casing to permit said oil to flow into said walled compartment, and said slide being adapted to dip into the oil in said walled compartment for conveying oil to said guide.

3. A power transmitting device for deep well pumps, comprising in combination, a casing adapted to contain a quantity of oil and having a walled compartment intermediate the side walls, said walled compartment merging into a guide, a shaft carried by said intermediate walled compartment, a gear carried by said shaft, a slide cooperating with said guide, means connecting said gear and slide, said intermediate wall having an opening therein below the level of oil in the casing to permit said oil to flow into said walled compartment, and said slide being adapted to dip into the oil in said walled compartment for conveying oil to said guide.

4. A power transmitting device for deep well pumps comprising in combination a casing having an opening in the bottom thereof and forming a compartment for lubricant, said casing also forming a hollow guide, a slide in said guide, and reciprocating means for causing said slide to dip into said lubricant for conveying lubricant to said guide, a pump rod carried by said slide and extending through said opening, and means for preventing the escape of lubricant through said bottom opening including a tube extending upwardly through said lubricant and terminating in said hollow guide.

5. A power transmitting device for deep well pumps comprising in combination a casing adapted to contain a quantity of lubricant and having means intermediate the side walls merging into a guide and dividing said casing into a plurality of compartments, a shaft carried by said means, a gear carried by the shaft in one of said compartments, a slide and a guide therefor disposed in another compartment, a reciprocating pump rod carried by said slide and extending through an opening provided in the bottom of said casing, means connecting said gear and slide, said first named means being provided with an opening between said compartments, and means for preventing the escape of lubricant through said opening in the bottom of said casing.

6. A power transmitting device for deep well pumps comprising in combination a casing adapted to contain a quantity of lubricant, means dividing said casing into two compartments, said means having an opening for the flow of lubricant from one compartment to the other, gearing within one of said compartments, the other of said compartments having an opening in the bottom, reciprocating means actuated by said gearing, said means including a slide and a pump rod, said rod extending through said bottom opening, a guide for the slide formed by said means, said slide being adapted to dip into the lubricant for conveying lubricant to said guide, and means for preventing the escape of lubricant through said bottom opening.

7. A power transmitting device for deep well pumps comprising in combination a casing adapted to contain a quantity of lubricant, means dividing said casing into two compartments, said means having an opening for the flow of lubricant from one compartment to the other, gearing within one of said compartments, the other of said compartments having an opening in the bottom, reciprocating means actuated by said gearing, said reciprocating means including a slide and a pump rod, said pump rod extending through said bottom opening, said slide being closed from interior of said gearing compartment by said first named means, a guide for the slide formed by said first named means, said slide being adapted to dip into lubricant for conveying lubricant to said guide, and means for preventing the escape of lubricant through said bottom opening.

8. A power transmitting device for deep well pumps comprising in combination a casing adapted to contain a quantity of lubricant, means dividing said casing into two compartments, said means having an opening for the flow of lubricant from one compartment to the other, gearing within one of said compartments, the other of said compartments having an opening in the bottom, reciprocating means actuated by said gearing, said reciprocating means including a hollow slide and a pump rod, said pump rod extending through said bottom opening, a guide for the slide formed by said first named means, said reciprocating means being adapted to dip into the lubricant for conveying lubricant to said guide, and means for preventing the escape of lubricant through said bottom opening including means extending upwardly from the bottom wall of said casing and terminating in said hollow slide.

9. A power transmitting device for deep well pumps comprising in combination a casing adapted to contain a quantity of lubricant and having a walled compartment intermediate the side walls thereof, a shaft carried by the intermediate walled compartment, a gear carried by said shaft, a shaft journaled in said casing above the level of lubricant, a gear carried by said shaft and meshing with said first named gear, said first named gear being adapted to dip into said lubricant and convey lubricant to said second named gear to be ejected by the meshing of said gears, means for conveying the ejected lubricant to said second named shaft, a guide carried by said intermediate walled compartment, a slide cooperating with said guide, a reciprocating pump rod carried by said slide and extending through an opening in the bottom of said casing, means connecting said gearing with said slide whereby said slide dips into said lubricant for conveying same to said guide, and means for preventing the escape of lubricant through said bottom opening.

10. A power transmitting device for deep well pumps, comprising in combination, a casing adapted to contain a quantity of oil and having a walled compartment intermediate the side walls thereof, a shaft carried by said intermediate walled compartment, a gear carried by the shaft on one side of said intermediate walled compartment, a guide formed integral with said intermediate walled compartment and extending upwardly therefrom, a slide disposed in said guide, means connecting said gear and slide, said intermediate walled compartment having an opening therein below the level of oil in the casing to permit said oil to flow into said walled compartment, and said slide being adapted to dip into the oil in said walled compartment for conveying oil to said integral guide.

11. A power transmitting device for deep well pumps comprising in combination, a casing adapted to contain a quantity of lubricant, means within the casing dividing said casing into an inner compartment and an outer compartment, a shaft carried by said means, a gear carried by the shaft, said gear being located within said outer compartment, a slide disposed in the inner compartment, said means providing a guide for the slide, a reciprocating pump rod carried by said slide and extending through an opening formed in the bottom of said casing, means connecting said gear and slide, said first named means having an opening therein between said compartments, and means for preventing the escape of lubricant through said opening in the bottom of said casing.

12. A power transmitting device for deep well pumps comprising in combination, a casing adapted to contain a quantity of lubricant and having a means dividing said casing into an inner compartment and an outer compartment, shaft means in said outer compartment extending from opposite sides of said first named means, gears carried by the shaft means on opposite sides of said first named means, a slide and a guide therefor disposed within the inner compartment, a reciprocating pump rod connected with said slide and extending through an opening formed by said casing in the bottom thereof, means connecting said gears and slide, said first named means having an opening therein below the level of lubricant in the casing, and means for preventing the escape of lubricant through said opening in the bottom of said casing.

13. A power head comprising a two-compartment casing, one compartment forming a lubricant container and having therein an operating shaft, a reciprocating member connected to the shaft and extending into the other compartment, a pump rod connected to the reciprocating member, and means forming a division between the compartments for guiding the reciprocating member.

14. A power head comprising a two-compartment casing, one compartment forming a lubricant container and having therein a rotating member, means on said rotating member for receiving a pitman, said means being eccentrically located relative to the axis of rotation of said member, a pitman mounted on and adapted to be reciprocated by said means, a guide secured to and reciprocated simultaneously with said pitman and extending into the other compartment, a pump rod connected to said guide, and means forming a division between the compartments for guiding said guide.

15. A power head comprising a two-compartment casing, one compartment forming a lubricant container and having a plurality of rotating members therein, means on each of said rotating members for receiving a portion of a pitman, both of said means being eccentrically located relative to the axis of rotation of said rotating members, an inverted substantially U-shaped pitman mounted on and adapted to be reciprocated by said means, a guide secured to and reciprocated simultaneously with said pitman and extending into the other compartment, a pump rod connected to said guide, and means forming a division between the compartments for guiding said guide.

JASPER A. SMITH.